United States Patent [19]

Kawamura et al.

[11] Patent Number: 4,802,155
[45] Date of Patent: Jan. 31, 1989

[54] RECORDING DISC PLAYBACK APPARATUS

[75] Inventors: Ichiro Kawamura; Yoshitaka Fujioka, both of Osaka; Tetsuo Yoshikane, Katano; Noboru Okuno, Sennan, all of Japan

[73] Assignee: Matsushita Electric Industrial Co., Ltd., Osaka, Japan

[21] Appl. No.: 7,947
[22] PCT Filed: Sep. 19, 1985
[86] PCT No.: PCT/JP85/00521
 § 371 Date: Dec. 22, 1986
 § 102(e) Date: Dec. 22, 1986
[87] PCT Pub. No.: WO87/05308
 PCT Pub. Date: Sep. 11, 1987
[51] Int. Cl.[4] .................. G11B 17/04; G11B 9/06
[52] U.S. Cl. .................................................. 369/77.2
[58] Field of Search ............................ 369/77.2, 194

[56] References Cited

U.S. PATENT DOCUMENTS 4,545,045 10/1985 Baer et al. ..................... 369/77.2

FOREIGN PATENT DOCUMENTS 3136397 7/1982 Fed. Rep. of Germany .
159269 10/1983 Japan .
159268 11/1983 Japan .
2042196 9/1980 United Kingdom ............... 369/77.2

Primary Examiner—Steven L. Stephan
Attorney, Agent, or Firm—Stevens, Davis, Miller & Mosher

[57] ABSTRACT

The present invention provides a recording disc playback apparatus employing a disc case (1) including: a case body (2) in which a disc-like recording medium (6) is accommodated; and at one end a lid (3) which is detachably fitted into the opening (7). This apparatus comprises: a playback apparatus body (50) including a playback means; lid release means (107, 108) for causing the release of the engagement between the lid (3) and the case body (2); clamp means (90) for clamping the recording medium (6); and a feed means by which the clamp means (90) is fed within the playback apparatus body (50) and the recording medium (6) is drawn out of the case body (2) so as to take a predetermined playback position. In the apparatus of this invention, when a user merely inserts the disc case (1) into the playback apparatus body (50), the recording medium (6) is automatically and positively taken out of the case (1) for reproduction purposes.

3 Claims, 24 Drawing Sheets

FIG. 4(A)
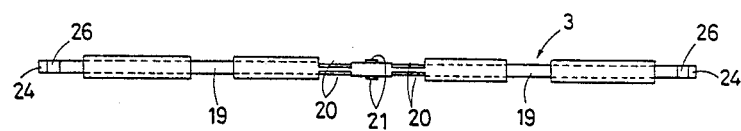
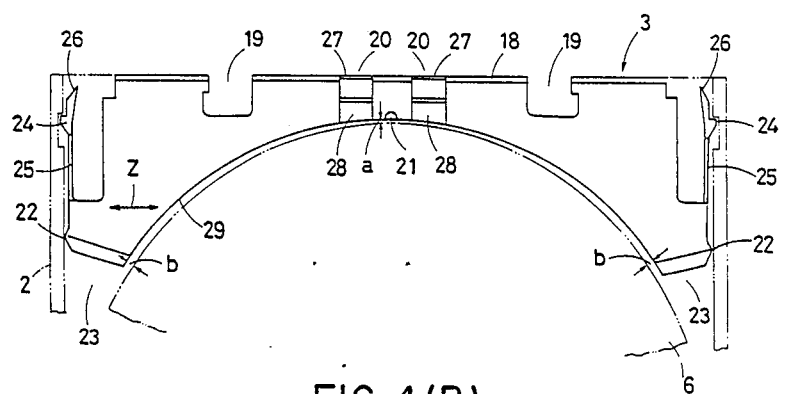
FIG. 4(B)
FIG.4(C)

FIG. 7A
FIG. 7B
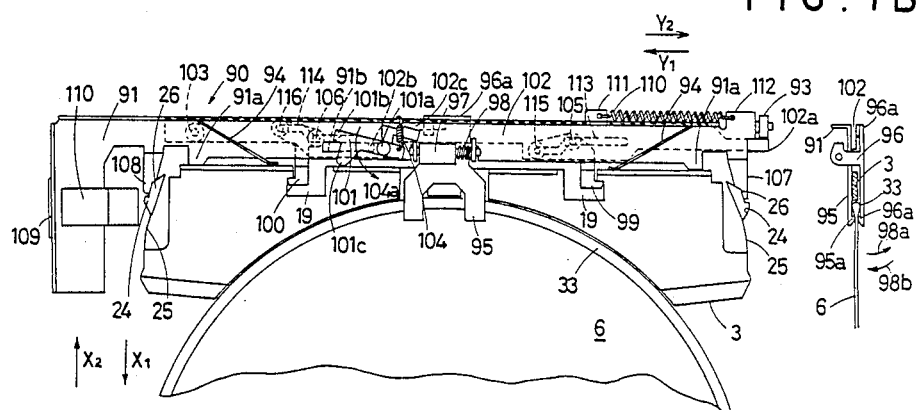
FIG. 7C
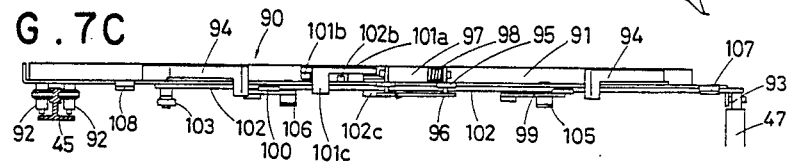

FIG. IIA
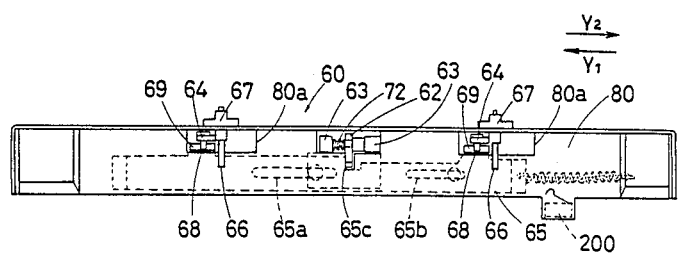
FIG. IIB
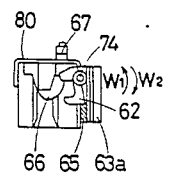
FIG. IIC
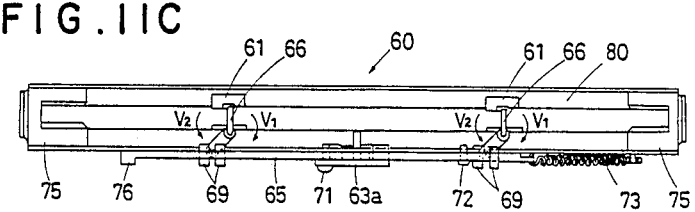

4,802,155

RECORDING DISC PLAYBACK APPARATUS

DESCRIPTION

Technical Field

The present invention relates to a recording disc playback apparatus in which a disc-like recording medium (hereinafter referred to as "disc") is automatically drawn out of a disc case in which it is accommodated, thereby enabling the reproduction of the signals recorded on the disc.

Background Art

Various playback systems used for reproduction of high-density recording discs, such as video discs, have heretofore adopted a so-called "semi-automatic disc-loading mechanism", as disclosed, for example, in the specification of Japanese Patent Unexamined Publication No. 111158. Such a conventional semi-automatic disc-loading type of playback apparatus is arranged in such a manner that a cylindrical disc case accommodating a disc is manually inserted into the interior of the playback apparatus, and the thus-emptied disc case alone is then manually drawn out of the apparatus, with the disc being left inside. However, such a prior-art semi-automatic disc-loading type of playback apparatus has various diasdvantages in that the disc case must be moved back and forth to a considerable extent when it is to be manually inserted into or drawn out of the apparatus, and also in that it is difficult to constitute a disc loading mechanism which is completely movable even when a user handles the apparatus very roughly.

To overcome the above-described drawbacks, it has been proposed to use a playback apparatus arranged such that the disc is automatically taken out of the case by means of feed roller means when the disc case is slightly inserted into the interior of the body of the playback apparatus. In this arrangement, since the disc cannot be fed in direct contact with the feed roller means, a frame surrounding the disc is provided within the disc case in order to draw the disc out of the case, so that the frame is fed by the roller means and the disc is thereby fed into the interior of the playback apparatus. However, such prior-art arrangement involves disadvantage in that, since the disc-drawing frame is needed within the disc case, there is no interchangeability with respect to other types of playback apparatus.

DISCLOSURE OF INVENTION

An object of the present invention is to provide a recording disc playback apparatus arranged in such a manner that a user only needs to insert a disc case very slightly into the apparatus, thereby enabling the disc to be automatically drawn out of the case for reproduction purposes and the action to be positively performed.

A recording disc playback apparatus in accordance with the present invention employing a disc case having: a case body including in an interior thereof an accommodating space in which a disc-like recording medium is capable of being accommodated and, at one end, an opening through which the recording medium is drawn out; and, at said one end, a lid which is detachably fitted into the opening, comprising:

lid release means for causing the release of the engagement between the opening of the case body and the lid;

clamp means for clamping the recording medium; and feed means for feeding the clamp means within the playback apparatus body.

The clamp means may be arranged to clamp the recording medium either by pressing the medium therebetween or by sandwiching the medium therebetween.

With this arrangement, when the disc case is merely inserted into the playback apparatus body, the lid is automatically disengaged from the opening of the case by the lid release means, and the recording medium is fed within the playback apparatus body while it is clamped by the clamp means, whereby the medium is held in place for reproduction purposes. As described above, since the recording medium is directly clamped by the clamp means, unlike the above mentioned proposal in which the feed roller means is used, the present invention possesses advantage in that it is unnecessary to provide the disc case with any frame surrounding the recording medium in order to feed the disc medium from the case.

BRIEF DESCRIPTION OF DRAWINGS

FIGS. 4A, 4B and 4C are respectively a front view, a plan view, and a side view of the lid used with the disc case;

FIGS. 7A, 7B and 7C are respectively a plan view, a sectional view and a front view of a disc clamping mechanism in the state of holding the lid and the disc;

FIGS. 11A, 11B and 11C are respectively a plan view, a sectional view and a front view schematically illustrating a slit expanding mechanism for expanding the opening (or slit) provided in a case in the state wherein no disc case is inserted;

BEST MODE FOR CARRYING OUT THE INVENTION

FIGS. 1A to 24C show a preferred embodiment of a recording disc playback apparatus of the present invention.

Figures 6A, 6B:
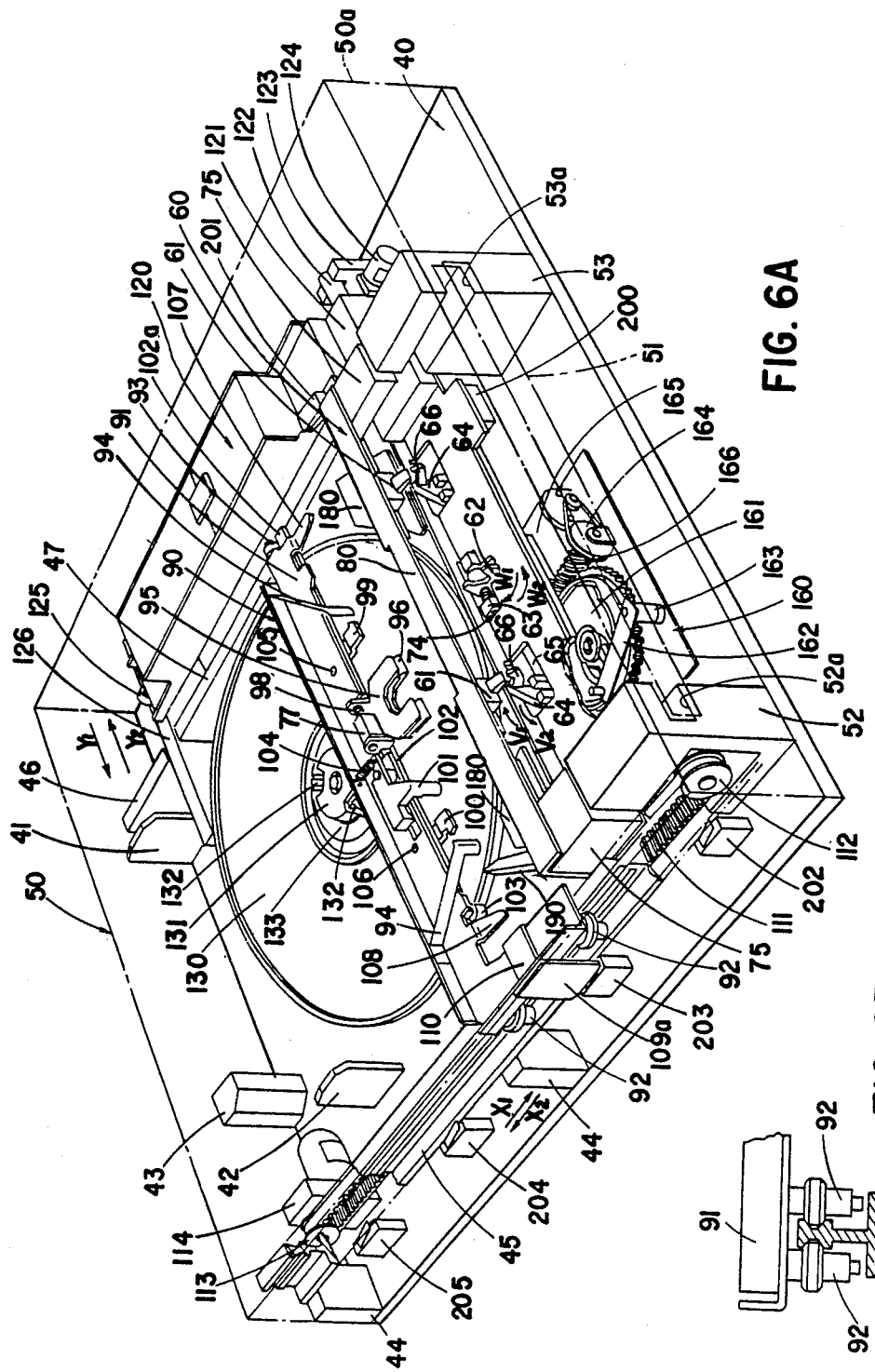
FIG. 6A is a perspective view illustrating the diagrammatic inner construction of the apparatus shown in FIG. 5.
FIG. 6B is a schematic sectional view of a rail section mounted on a movable base of the apparatus shown in FIG. 6A.

The general construction of the illustrated embodiment will be described below with reference to FIGS. 6A to 6C. Referring first to FIG. 6A, a playback apparatus body 50 includes a chassis 40, an external casing 50a, a turntable 130 and an arm housing 120 provided with reproducing head means. A movable base 91 is disposed on the chassis 40 for free movement in the forward and backward directions (in the directions indicated by arrows $X_1$ and $X_2$). The movable base 91 has at the opposite end portions thereof a pair of tongue-shaped projections 107 and 108 serving as means for releasing the engagement between a case 2 (shown in FIG. 2) and a lid 3. The movable base 91 further includes a disc clamping mechanism 90 serving as means for clamping a disc 6. The disc clamping mechanism 90 has an upper clamp arm 95 and a lower clamp arm 96 movably mounted on the movable base 91. Lid locking members 99 and 100 are mounted pivotally in the horizontal direction on opposite sides of the clamp arms 95 and 96 of the movable base 91, serving as means for locking the lid by engagement with each other.

The overall construction of the recording disc playback apparatus according to the present invention will be described in detail below.

Figure 1:
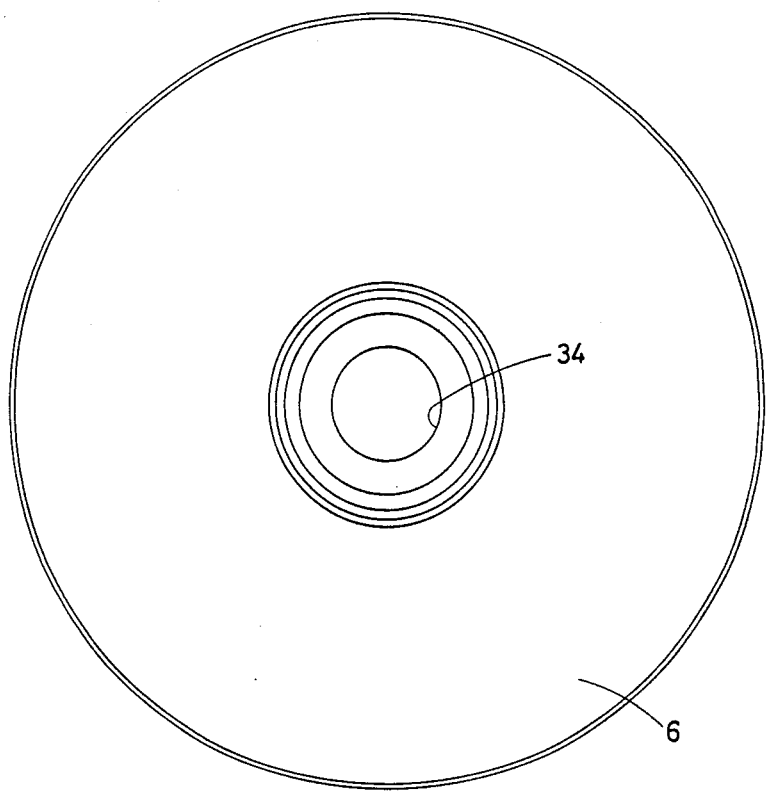
FIGS. 1A and 1B respectively are plan and sectional views diagrammatically showing a disc adaptable for use with a preferred embodiment of the present invention.
Figure 1:
Figure 2:
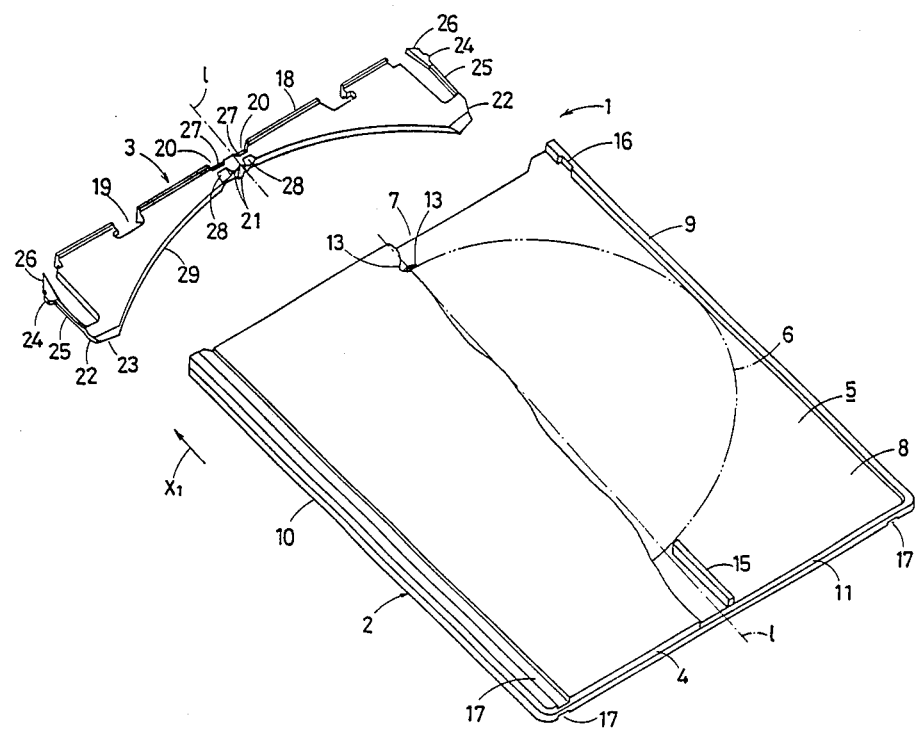
FIG. 2 is a perspective view, illustrating a disc case, partially cut away, accommodating the disc.

FIGS. 1 to 4 illustrate the construction of a disc and a disc case adaptable for use with a preferred embodiment of the recording disc playback apparatus of this invention. Referring first to FIG. 1, the disc 6 includes a central hole 34, an outer circumferential groove guard 33 of raised form, and an inner circumferential groove guard 32. As shown in FIG. 2, the disc case 1 in a rectangular shape in plan view includes a disc-case body 2 (hereinafter referred to as "case") and the lid 3 which is detachably fitted into an elongated opening 7 formed at the front side of the case 2 relative to the direction in which the case 2 is inserted into the playback apparatus as indicated by the arrow $X_1$. The case 2 and the lid 3 may be made of polystyrene resin, for example. The interior of the case 2 includes a disc-accommodating space 5 which is flat-shaped in the breadthwise and lengthwise directions of the case 2, the disc 6 being accommodated by the space 5. The space 5 is provided with the elongated opening 7 formed on the front side of the case 2 which is inserted in the direction $X_1$, but is closed on the remaining three sides. As shown in FIG. 2, the case 2 includes a flat panel 8 having a pair of groove-like recesses 17 on opposite sides and elongated flanges 9, 10 and 11 extending along the remaining three edges of the panel 8. An engagement hole 13 is formed in the vicinity of the elongated opening 7 and on the center line of the panel 8 in an engaged relationship with a projection of the lid 3 which will be described below. Engagement notches 16 are formed in the elongated flanges 9 and 10 adjacent to the opposite ends of the opening 7 in such a manner that corresponding projections of the lid 3 may be engaged with the notches 16.

Figure 3:
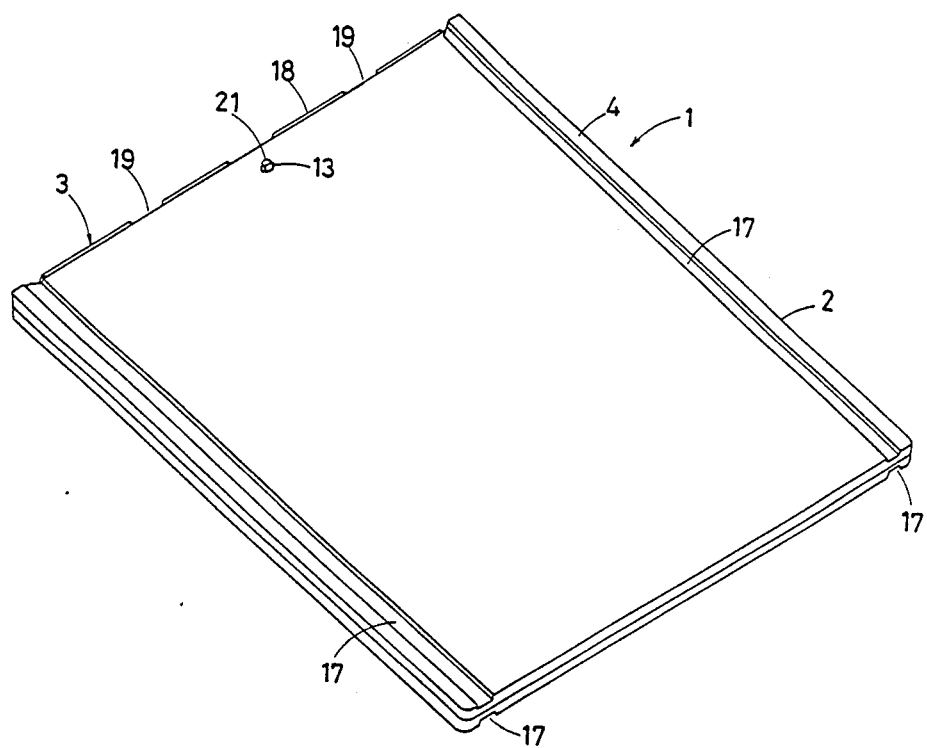
FIG. 3 is a perspective view, similar to FIG. 2, illustrating an assembled disc case.

The lid 3 is provided with a flange portion 18 at one edge thereof for the purpose of closing the elongated opening 7 of the case 2 while the lid 3 is fixed to the case 2 in a mutually-engaged relation. Two notches 19 are formed in the above-mentioned edge of the lid 3 in a symmetrical relationship with respect to a center line (l) in such a way that corresponding slit expanding members described later may be fitted into the respective notches 19. Furthermore, leaf springs 25 are formed on opposite ends of the lid 3, each of the springs 25 having a projection 24 for fixing the lid 3 to the case 2 by engagement with the associated engagement hole 16. The tip of the respective projections 24 is provided with a slope 26 which is so formed as to engage with the corresponding lid release members 107, 108. FIG. 3 is a perspective view of the case 2 in which the disc 6 and the lid 3 are incorporated, the disc 6 being secured in the lengthwise and breadthwise directions thereof. Also, in FIG. 3, since the lid 3 is fitted into the opening 7 of the case 2 and the opening 7 is thereby closed, the disc 6 is accommodated by the case 2 without entailing any risk of its dropping out of the case 2.

FIGS. 4A, 4B and 4C respectively illustrate the detail of the lid 3. As shown in FIG. 4B, the edge of the lid 3 facing the periphery of the disc 6 is formed in an arcuated shape in which, as an example, each clearance b formed between opposite ends of the edge of the lid 3 and the periphery of the disc 6 is larger than a clearance a between the central portions of the edge of the lid 3 and the corresponding portion of the periphery of the disc 6. These clearances are provided for the purpose of enabling a stable operation even if the relative position between the lid 3 and the disc 6 shifts slightly in the directions indicated by a double-headed arrow Z during the reproduction operation described later FIGS. 5, 6A, 6B and 6C are diagrammatic perspective views of the recording disc playback apparatus in a preferred embodiment form of this invention, respectively.

Figure 5:
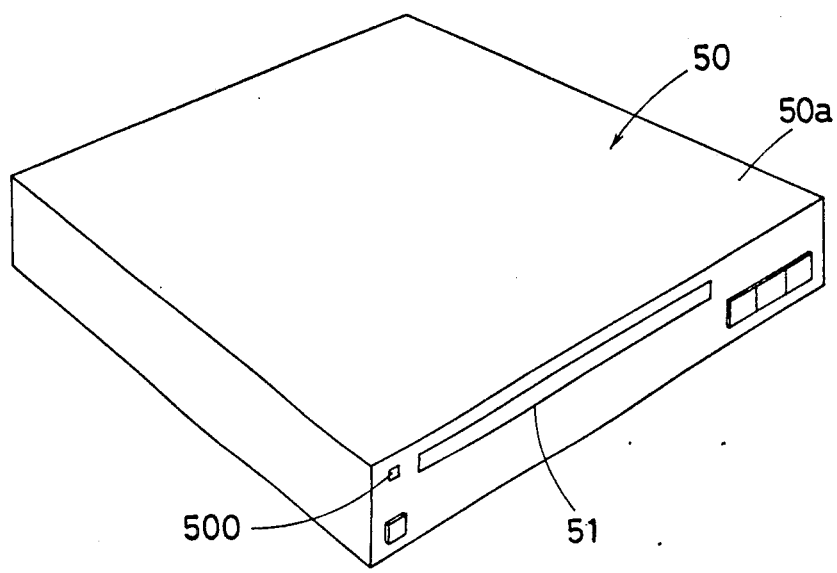
FIG. 5 is a schematic perspective view of the appearance of a preferred embodiment of the recording disc playback apparatus of the present invention.

Referring to FIG. 5 diagrammatically showing the appearance of the recording disc playback apparatus, a case insertion slit 51 is formed in the external casing 50a of the playback apparatus body 50. FIGS. 6A, 6B and 6C diagrammatically show the basic construction of the recording disc playback apparatus.

Referring to FIG. 6A, the turntable 130 is disposed in such a manner that the disc 6 may be placed thereon for playback purposes. A center boss 131 serves as means for centering the disc 6 placed on the turntable 130. A clamp 132 is adapted to press the disc 6 against the turntable 130. Guide members 52 and 53 are fixed to the chassis 40 as means for guiding the inserted case 2 toward the interior of the playback apparatus body 50, and have guide grooves 52a and 53a, respectively. A slit expanding mechanism 60 is fixed to the chassis 40 in the vicinity of the case insertion slit 51. Slit expanding members 66 are supported by a stationary base 80 for free vertical movement, and the members 66 and corresponding support members 61 function to expand the opening 7 (or slit) of the case 2 in cooperation with each other. Incidentally, the stationary base 80 is fixed to the chassis 40. An engagement member 62 is rotatably supported on the stationary base 80 by a combination of a shaft 74 and bearings 63, and acts to engage with the engagement hole 13 of the case 2. A disc clamping mechanism 90 has an upper clamp arm 95 and a lower clamp arm 96. The arm 95 is integral with the movable base 91, while the arm 96 is supported by a bearing 97 for free vertical movement, the disc 6 being clamped therebetween. The lid locking members 99 and 100 are respectively supported by pins 105 and 106 in such a manner that they are horizontally rotatable with respect to the movable base 91, engaging with the corresponding notches 19 of the lid 3, and thereby locking the lid 3. Leaf springs 94 are mounted on the movable base 91 in such a manner as to be capable of coming into contact with one edge of the lid 3. The tongue-like release member 107, 108 are integral with the movable base 91, and function to come into engagement with the slopes 26 of the projections 24 of the lid 3, thereby releasing the engagement between the lid 3 and the case 2.

The movable base 91 of the disc clamping mechanism 90 is carried by rails 45, 46 and 47 in such a way as to be capable of moving in the forward and backward directions (in the directions indicated by arrows $X_1$ and $X_2$). As shown in FIG. 6B, the rail 45 has a V groove on opposite sides thereof. Rollers 92 fixed to the movable base 91 are rotatably fitted into the corresponding V grooves of the rail 45, thereby preventing the disc clamping mechanism 90 from running off the rails 45, 46 and 47. The movable base 91 is fixed to a belt 111 by a connecting piece 109a. The belt 111 is stretched between pulleys 112 and 113 and is driven by the motion of the motor 114 with a speed reducer so as tio feed the disc clamping mechanism 90. An arm housing 120 is supported by a rail 126 and a shaft 122 for free movement in the rightward and leftward directions (in the directions indicated by arrows $Y_1$ and $Y_2$) over the turntable 130. In the same manner as the disc clamping mechanism 90, the arm housing 120 is also driven by a motor 124 through a belt (not shown) and is arranged to be fed parallel to the surface of the disc 6 placed on the turntable 130 so as to pick up the signals recorded on the disc 6.

Figure 6C:
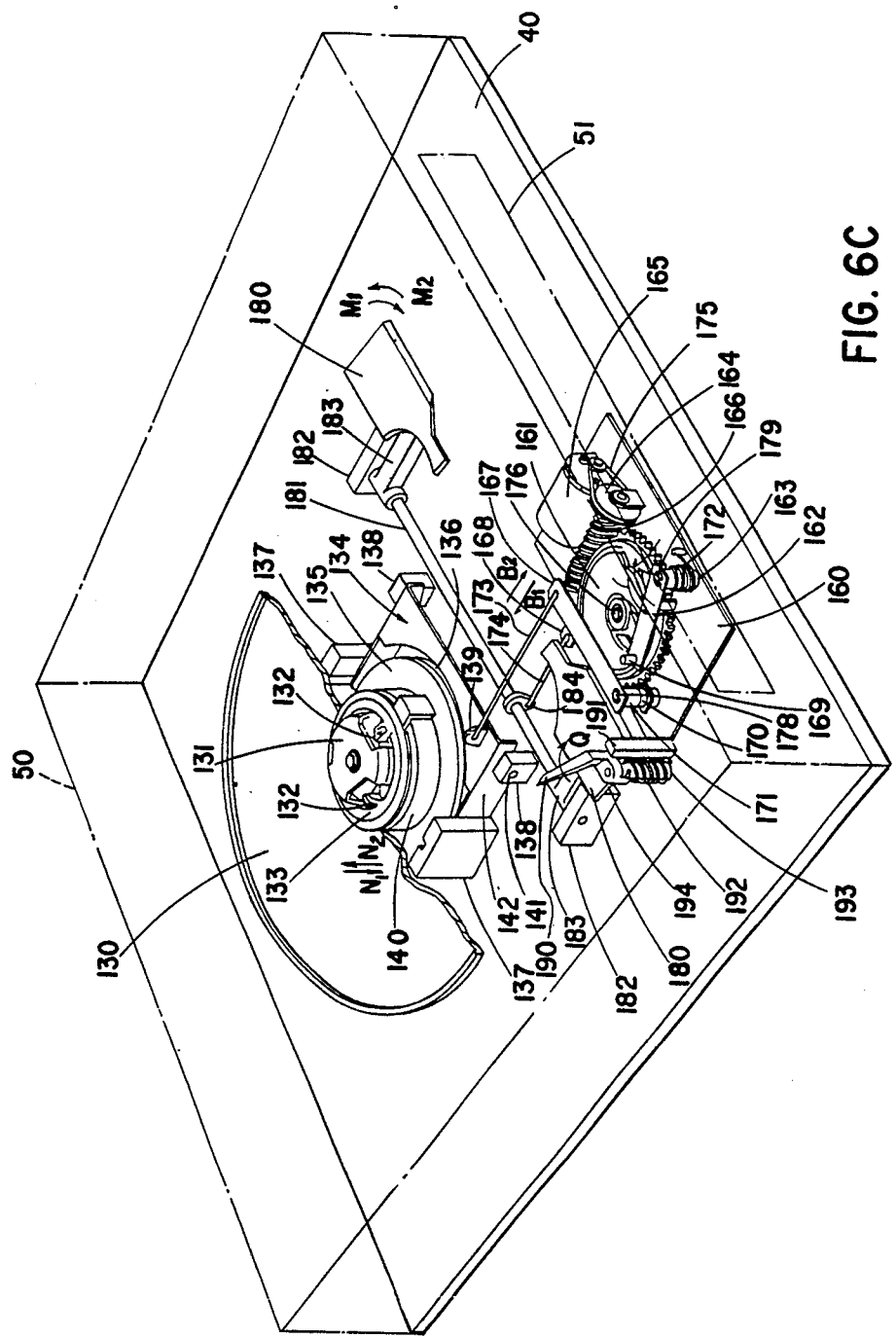
FIG. 6C is a perspective view illustrating the diagrammatic inner constructions of a cam unit and a disc raising mechanism.

Referring to FIG. 6C, a support 180 for supporting the disc 6 is carried by a shaft 181 and bearings 182 for free vertical movement (in the directions indicated by arrows $M_1$ and $M_2$). As shown in FIG. 6C, the support 180 is constituted by right and left members, and in order to support the groove guard 33 of the disc 6, both members are arranged to be capable of covering a range larger that the diameter of the disc 6 beyond the groove guard 33 in the $Y_1$, $Y_2$ directions (refer to FIG. 6A). The support 180 is adapted to be positioned below the level of the turntable 130, and also above that of the turntable 130, where it is possible to support the disc 6 clamped by the disc clamp mechanism 90.

A disc lifting mechanism 134 is constituted in the following manner. A lift arm 142 is supported by a shaft 141 and bearings 138, pivotably in the vertical direction. The lift arm 142 is made to turn so as to vertically move a lift ring 136 which is (see FIGS. 24A to 24C) located under an elevation ring 135 and is supported by the lift arm 142, thereby assuming a position in which it can support the disc 6 either above or on the turntable 130 by means of a disc support ring 133 fixed to the elevation ring 135.

A cam unit indicated generally at 160 is arranged to drive the support 180, the disc raising mechanism 134 and the slit expanding mechanism 60. A cam 161 which is supported rotatably in the horizontal direction by a shaft 176 is arranged to be driven through a worm gear 166 by the motion of a cam driving motor 165. A lever 162 is supported by a shaft 179 so that it may swing horizontally, and is urged by a spring 172 in the direction indicated by a arrow $P_1$. Levers 167 and 168 are pivotably supported by a common shaft 178 and bearings 170, 171, respectively. Each of the levers 162, 167 and 168 is disposed in interlocking relationship with the cam 161, and is thereby actuated in accordance with a timing chart (FIG. 15) representative of the timing of operation of the cam 161 which will be described below. A reversing lever 190 for changing over the action of the disc clamping mechanism 90 is supported pivotally in the horizontal direction by a shaft 194, being urged by a spring 192 in the direction indicated by arrow Q, and the rotation of the lever 190 being limited by a block 191. Reference numeral 140 denotes a motor for driving the turntable 130.

Referring back to FIG. 6A, reference numerals 200 to 205 denote microswitches. The microswitches 200 serves as means for detecting the action of the slit expanding mechanism 60 while the microswitches 201 serves as means for detecting that of the disc clamping mechanism 90, and the other microswitches 202 to 205 serve as means for detecting the position of the disc clamping mechanism 90.

The disc clamping mechanism 90 will be described in detail below with specific reference to FIGS. 7A, 7B, 7C, 8A, 8B, 9A, 9B, 10A and 10B which diagrammatically show the structure and the operation of the disc clamping mechanism 90.

Referring to FIG. 7A to 7C, the movable base 91 has right and left projections 91a which are adapted to come into contact with the front edge of the lid 3 when the disc 6 and the lid 3 are retained within the body 5. Four rollers 92 (two of which are shown in FIG. 7C) are supported by the movable base 91 in rotatable engagement with the rail 45 as shown in FIG. 7C. The movable base 91 has a rotatable roller 93 at one end opposite to the location of the rollers 92. The leaf springs 94 are mounted at a location where they may abut against the front edge of the lid 3. The upper clamp arm 95 is integral with the movable base 91 and has a claw 95a as shown in FIG. 7B, while the lower clamp arm 96 is pivotably supported by a bearing 97 and is urged by a spring 98 in the direction indicated by arrow 98a. The lid locking members 99 and 100 are brought into engagement with the corresponding notches 19 of the lid 3, thereby locking the lid 3. The lid locking members 99 and 100 are respectively supported by the pins 105 and 106 in such a manner as to be capable of being horizontally pivoted with respect to the movable base 91. Also, the members 99 and 100 respectively have follower ends 115 and 116 guided along the associated cam grooves 102d and 102e formed in the sliding member 102. The sliding member 102 having an essentially planar shape is substantially linearly moved in the directions indicated by arrows $Y_1$ and $Y_2$ since the cam grooves 102d and 102e are respectively guided by the pins 105 and 106. The sliding member 102 has a rotatable roller 103 and a projection 102b to the left of the center as viewed in FIG. 7A, while the member 102 has a projection 102a and a spring retainer 110a on the opposite side to the location of the roller 103. The projection 102b is so disposed as to come into contact with a contact portion 101b of a swivel member 101 through a square hole 91b formed in the movable base 91 (refer to FIG. 7C). A spring 110 which is disposed between the spring retainer 110a and another spring retainer 110b formed on the movable base 91 is arranged to consistently urge the sliding member 102 in the direction indicated by arrow $Y_2$. As shown digrammatically in FIGS. 10A and 10B, the sliding member 102 has a wedge-like projection 102c so formed as to be capable of coming into contact with a contact end 96a of the lower clamp arm 96. The swivel member 101 is so disposed as to be rotatable about the axis of a fulcrum 101a in the horizontal direction with respect to the movable base 91, and to be urged by a spring 104 so that it may be rotated in the direction indicated by arrow 104a as shown in FIG. 7A. Also, the swivel member 101 has a projection 101c which is capable of contacting the front edge of the lid 3 as well as the above-described adjoining portion 101b, when the lid 3 and the case 6 are retained within the body 50. The projection 101c has a slope such as that shown in FIG. 7A, for example.

The release members 107 and 108 which are formed on opposite ends of the movable base 91 are brought into engagement with the corresponding slopes 26 of the projections 24 of the lid 3, thereby releasing the engagement between the lid 3 and the case 2. A contact plate 109 is disposed at a position where it may come into contact with each of the microswitches 202 through 205. The connecting piece 110' serves as means for connecting the belt 111 and the disc clamping mechanism 90.

The description below concerns the operation of the disc clamping mechanism 90, this mechanism assuming the following three states.

A first state is hereinafter referred to as "lid/disc holding state" in which, as shown in FIG. 7A, the lid 3 is locked in engaged relationship with the lid locking members 99 and 100, and the disc 6 is clamped between the upper and lower clamp arms 95 and 96. In this state, the sliding member 102 is biased to the rightmost position, as viewed in FIG. 7A (in the direction indicated by arrow $Y_2$). The lid locking members 99 and 100 are located such as to restrict the lid 3 to maintain the illustrated position since the follower ends 115 and 116 are guided by the cam grooves 102d and 102e, respectively. Each of the leaf springs 94, as illustrated in FIG. 7A, is maintained in contact with the lid 3 in such a manner as to urge the lid 3 forwardly (in the direction indicated by arrow $X_1$). The projection 101c of the swivel member 101 is maintained in contact with the lid 3. The lower clamp arm 96 clamps the groove guard 33 of the disc 6 as shown in FIG. 7B. In this state, a claw 95a of the upper clamp arm 95 and the adjoining end 96a of the lower clamp arm 96 are engaged with the groove guard 33. In addition, as can be seen from FIG. 10B, since the adjoining end 96a is engaged with the wedge-like projection 102c and the sliding member 102 is urged rightwardly as viewed in the Figure (in the direction indicated by arrow $Y_1$) by virtue of the force applied by the spring 110, the lower clamp arm 96 is urged in the direction indicated by the arrow 98b shown in FIG. 7B, thereby providing the clamping of the groove guard 33.

Figure 8A:
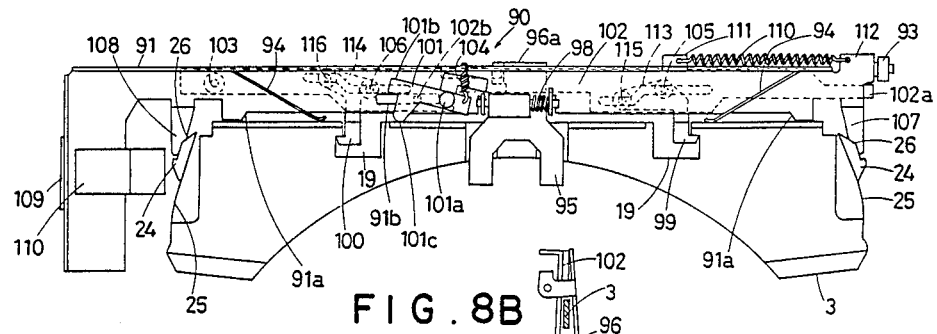
FIGS. 8A and 8B are respectively a plan view and a sectional view of the disc clamping mechanism in the state of holding the lid.
Figure 8B:
Figure 10A:
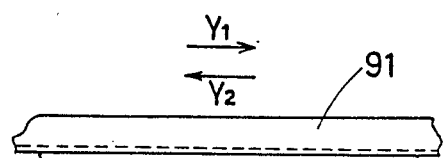
FIGS. 10A and 10B are partially enlarged, side views schematically showing the relationship between a sliding member and a clamp arm incorporated in the disc clamping mechanism in accordance with the present invention.
Figure 10B:
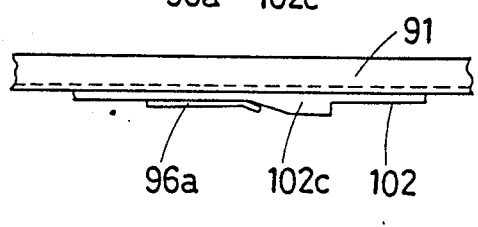

A second state is hereinafter referred to as "lid holding state" in which, as shown in FIG. 8A, the lid 3 is locked while the disc 6 is not clamped. In this state, the sliding member 104 takes the intermediate position of its three states. The lid locking members 99, 100, the leaf springs 94 and the swivel member 101 respectively assume states similar to those in the above-described "lid/disc holding state", with the lid 3 being locked as shown in FIGS. 8A and 8B. However, in this state, since the sliding member 102 is shifted leftward as viewed in FIG. 8A (in the direction $Y_1$) as compared with the "lid/disc holding state", the wedge-like projection 102c is no longer in contact with the adjoining end 96a, as shown in FIG. 10B. Therefore, the lower clamp arm 96, as shown in FIG. 8B, is urged to open in the direction indicated by the arrow 98a by the force applied by the spring 98, thereby unclamping the disc 6.

Figure 9A:
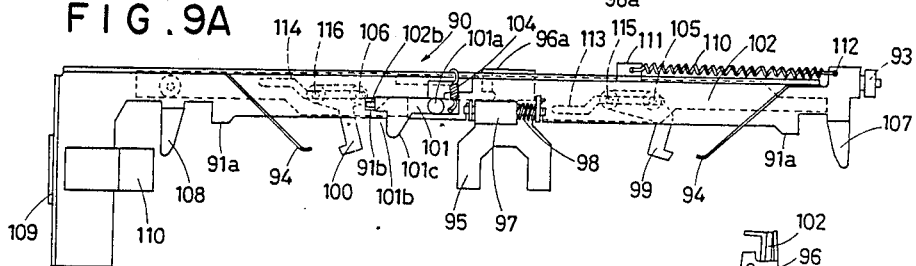
FIGS. 9A and 9B are respectively a plan view and a sectional view of the disc clamping mechanism in the state wherein it is holding neither the lid nor the disc.
Figure 9B:
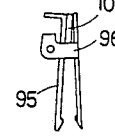

A third state is hereinafter referred to as "non-holding state" in which, as shown in FIGS. 9A and 9B, neither the lid 3 is locked, nor the disc 6 clamped. The sliding member 102 is biased to the leftmost position of all three positions as viewed in FIG. 9A (in the direction $Y_1$). The follower ends 115 and 116 are guided by the cam grooves 102d and 102e, and thus the lid locking members 99 and 100 are opened as shown in FIG. 9A. The lower clamp arm 96 is urged to open, similar to the state shown in FIG. 8B, and does not in this state clamp the disc 6. The swivel member 101 takes the position shown in FIG. 9A, the contact end 101b being maintained in contact with the projection 102b of the sliding member 102, and the force applied by the spring 110 preventing the sliding member 102 from moving rightward as viewed in FIG. 9A (in the direction $Y_2$).

In this fashion, the disc clamping mechanism 90 is capable of taking the above-described three states: the "lid/disc holding state"; the "lid holding state"; and the "non-holding state". Such states are selected in accordance with the three positions which the sliding member 102 is capable of assuming (along the sliding directions indicated by the arrows $Y_1$ and $Y_2$). Specifically, the state of the disc clamping mechanism 90 can be changed into any one of the "lid/disc holding state", the "lid holding state" and the "non-holding state" by shifting the position of the sliding member 102 in the $Y_1$ and $Y_2$ directions. However, the "lid holding state" of the aforementioned three states is maintained by restricting the state of the sliding member 102 to that shown in FIG. 8 by any means capable of counterring the force of the spring 110.

The slit expanding mechanism 60 will be described in detail below. The structure and the operation of the slit expanding mechanism 60 are schematically shown in FIGS. 11A, 11B, 11C, 12A, 12B, 12C, 13A, 13B and 13C. The stationary base 80 of the slit expanding mechanism 60 is fixed to the chassis 40 of the illustrated playback apparatus and in the vicinity of the case insertion slit 51, as previously mentioned. Support members 61 are fixed to the stationary base 80, and the engagement member 62 is supported pivotably in the vertical direction by a combination of the shaft 74 and the bearings 63 fixed to the stationary base 80. A spring 72 urges the engagement member 62 in the direction indicated by arrow $W_1$ shown in FIG. 11B. The slit expanding members 66 are disposed in correspondence with the support members 61, and are supported rotatably in the vertical direction by the bearings 67 fixed to the stationary base 80. Each of the expanding members 66 is provided with an arm 64 and a contact end 68. A slider 65, as shown in FIG. 11C, is disposed so that it may slide with respect to the stationary base 80. The slider 65 having slots 65a and 65b is arranged to slide linearly in the directions indicated by the arrows $Y_1$ and $Y_2$ of FIG. 11A by means of engagement between the slots 65a, 65b and pins 71, 70, respectively. The slider 65, at its central portion, is supported by a common adjoining portion 63a of the bearings 63, as shown in FIG. 11C in such a manner that the slide 65 is inhibited from bending to any substantial extent in the downward direction. Also, the slider 65 has a pair of engagement portions 69, and this construction permits the expanding members 66 to be rotated in the direction indicated by an arrow $V_2$ in FIG. 11C as the slider 65 moves rightwardly as viewed in the same Figure (in the direction indicated by arrow $Y_2$). Conversely, when the slider 65 moves leftwardly as viewed in FIG. 11C (in the direction indicated by arrow $Y_1$), the expanding members 66 are rotated in the direction indicated by arrow $V_1$. A spring 73 is disposed between the slider 65 and the stationary base 80 as shown in FIG. 11C, consistently urging the slider 65 rightwardly as viewed in FIG. 11A (in the direction $Y_2$). Incidentally, the slider 65 has an abutment portion 76 and a cutout 65c. Case guides 75 and 75 fixed to the stationary base 80 serve as means for guiding the case 2.

The following description concerns the manner in which the slit expanding mechanism 60 having the above-described construction expands the opening 7 (or slit) of the case 2 and holds the disc 6 in place within the playback apparatus of this invention.

The slit expanding mechanism 60 assumes the state shown in FIGS. 11A to 11C at times when no case 2 is inserted in the playback apparatus. Specifically, since the cutout 65c of the slider 65 is in contact with the engagement member 62, the slider 65 is maintained in the illustrated state against the force applied by the spring 73. Therefore, the expanding members 66 are maintained in the positions shown in FIGS. 11B and 11C, and the case 2 is inserted along the case guides 75 into the slit expanding mechanism 60 through the disc insertion slit 51 of the playback apparatus body 50.

Figure 12A:
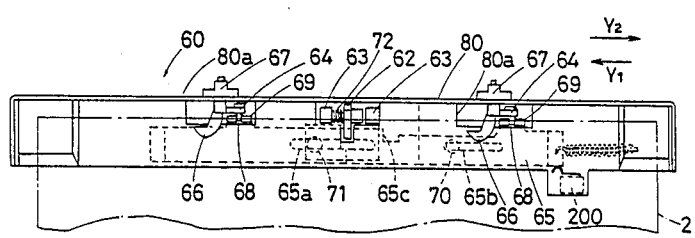
FIGS. 12A, 12B and 12C are a plan view, a sectional view and a front view, respectively, a slit expanding mechanism of the same type in the state wherein a disc case is inserted.
Figure 12B:
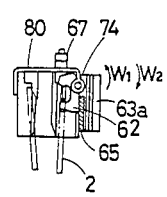
Figure 12C:
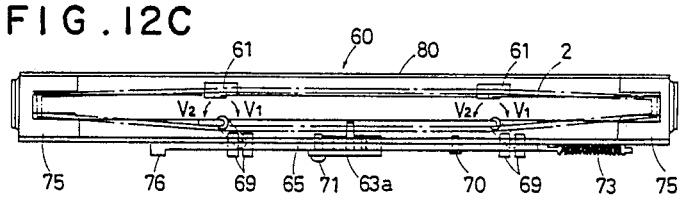
Figure 13A:
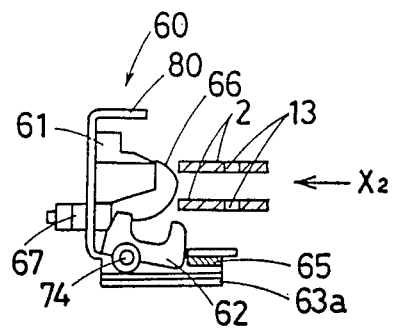
FIGS. 13A, 13B and 13C are sectional side views of a part of the slit expanding mechanism of this invention, for schematically showing how the mechanism expands the slit within the body.
Figure 13B:
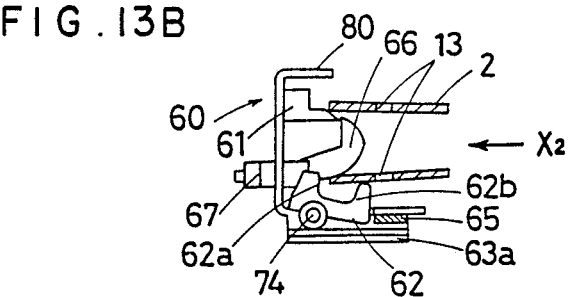
Figure 13C:
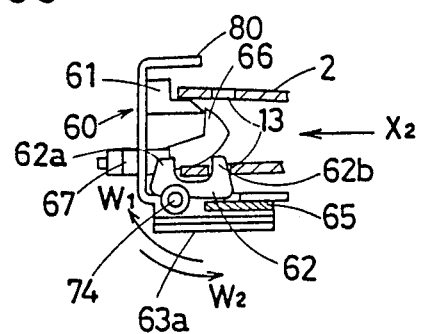

FIGS. 13A to 13C diagrammatically illustrate the steps of the case 2 being inserted into the slit expanding mechanism 60. FIG. 13A shows the state of the slit mechanism 60 corresponding to that shown in FIGS. 11A to 11C. In this state, when the case 2, as shown, in inserted into the slit expanding mechanism 60 in the direction indicated by arrow $X_2$ through the case guides 75, the expanding members 66 comes into contact with the slit of the case 2, thereby expanding the slit of the case 2 as shown in FIG. 13B. Subsequently, when the case 2 is further inserted, the contact end 62a of the engagement member 62 comes into contact with the edge of the slit of the case 2 and the engagement member 62 is made to rotate in the direction indicated by arrow $W_2$ as viewed in FIG. 13C, so that an engagement end 62b of the engagement member 62 engages with the engagement hole 13 of the case 2. In this state, the contact between the cutout 65c of the slider 65 and the engagement member 62 is no longer provided, and thus the slider 65 is allowed to slide rightwardly as shown in FIG. 12B (in the direction $Y_2$) by the force applied by the spring 73. In the state shown in FIG. 12B, each of the expanding members 66 is rotated in the direction indicated by an arrow $V_2$ and assumes a state wherein it does not preclude the disc 6 from being taken out of the case 2. FIGS. 12A to 12C respectively show the state of the case 2 at this time, that is, the case 2 having the expanded opening 7 (or slit) as depicted by a one-dot chain line. In this state, the engagement member 62 is restricted so as not to rotate in the direction $W_1$ as shown in FIG. 12B. Next, when the abutment end 76 of the slider 65 is shifted leftwardly as viewed in FIG. 12A (in the direction $Y_1$) by known means, the slider 65 is moved in the direction $Y_1$. When the cutout 65c reaches the position of the engagement member 62 as shown in FIG. 11A, the engagement member 62 is urged to rotate in the direction indicated by arrow $W_1$ by the force applied by the spring 72, and thus the engagement hole 13 of the case 2 is brought out of engagement with the engagement member 62.

In the manner described above, the slit expanding mechanism 60 incorporating the preferred embodiment is provided with means for expanding the opening 7 of the case 2 and means for engaging with the case 2, and in addition, the engagement with the case 2 can be easily released by moving the slider 65.

In the illustrated embodiment, since the microswitch 200 is disposed at a location where it may adjoin the slider 65 as shown in FIGS. 11A to 11C and 12A to 12C, when the case 2 is inserted into the slit expanding mechanism 60 and the slider 65 is moved by means of engagement with the case 2, the microswitch 200 is actuated so as to detect the fact that the slit of the case 2 is expanded and the case 2 is engaged with the engagement member 62. Also, in a state wherein the case 2 is locked by the engagement member 62 in an engaged manner, the movement of the engagement member 62, as previously described, is limited by the slider 65, whereby the case 2 is held in place within the playback apparatus body 50, without entailing any risk of the case 2 easily being running off.

As described above, the microswitch 200 is used so as to detect whether or not the case 2 is locked by means of engagement with the engagement member 62. In addition, in order to inform a user of the detected state, a indicator lamp 500 (as shown schematically in FIG. 5) is disposed on the front panel of the playback apparatus body 50. This construction enables the user to easily confirm whether or not the case 2 is locked inside. The indicator lamp 500 is connected such that it continues to be lit while the engagement member 62 is in an engage state. Alternatively, a buzzer means may be employed as the indicator means, and the buzzer means is preferably arranged to sound each time the engagement member 62 is shifted from engagement into disengagement.

The cam unit 160 will be described below in detail. FIGS. 14A, 14B and FIGS. 16A to 16D respectively illustrate the operation of the cam unit 160, and FIG. 15 is a timing chart used as an aid to understanding the operation of each lever associated with the cam unit 160.

Figure 14A:
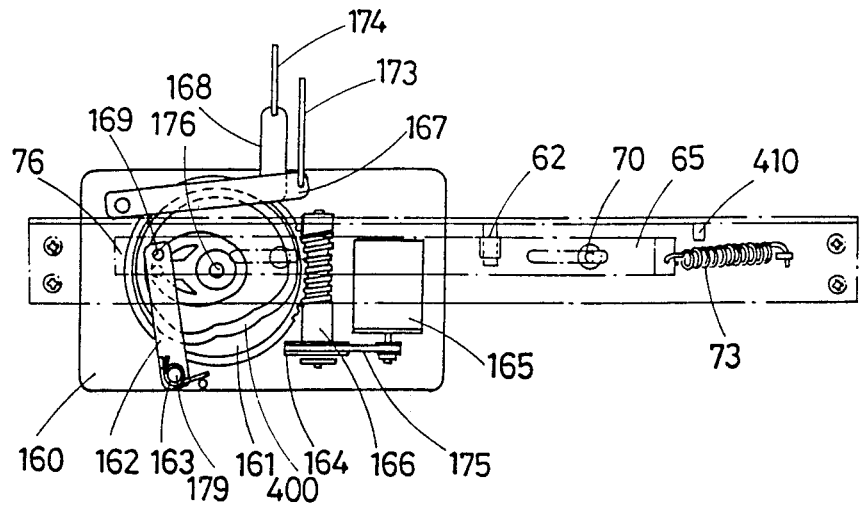
FIGS. 14A and 14B are top plan views of the cam unit incorporated in the preferred embodiment of the present invention, respectively.
Figure 14B:
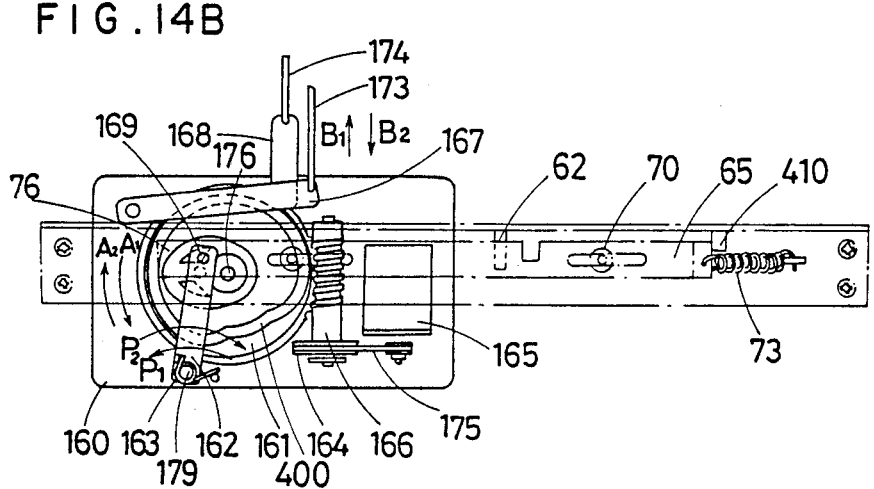
Figure 15:
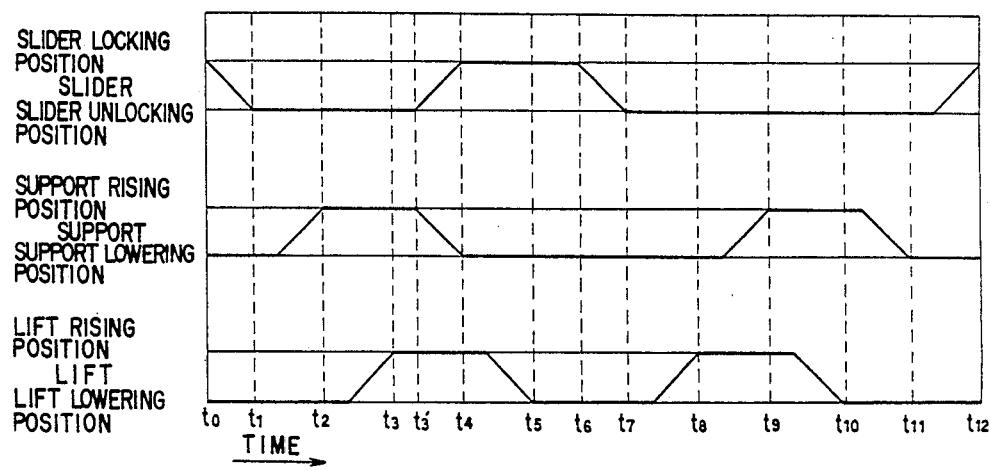
FIG. 15 is a timing chart of the cam unit shown in FIGS. 14A and 14B.

As shown schematically in FIGS. 14A and 14B, a cam 161 is supported rotatably in the horizontal direction by a shaft 176, and the power of a cam driving motor 165 is transmitted to the cam 161 through a belt 175 and a worm gear 166 in such a manner that the cam 161 may be rotated in the forward and reverse directions. A lever 162 is pivotably supported by a shaft 179, the levers 167 and 168 are pivotally supported by a common shaft 178, and an interlocking member (not shown) is so disposed as to engage with the cam groove 400 of the cam 161, whereby each of the levers 162, 167 and 168 is moved in an interlocking relationship with the cam groove 400 while the cam 161 is rotating. The lever 167 is linked with the disc raising mechanism 134 through a link member 173 in order to actuate the mechanism 134. The lever 168 is linked with a coupling member 184 secured to a shaft 181 through a link member 174 so that the shaft 181 may be rotated back and forth to move the support 180 up and down (the shaft 181 and the member 184 are shown in FIG. 6C, but are not illustrated in FIGS. 14A and 14B). The lever 162 is consistently urged in the direction indicated by arrow $P_1$ by means of a coiled spring 163, and thus a interlocking member 404 formed on the lever 162 is consistently fitted within the cam groove and is urged in the direction $P_1$. An engagement pin 169 is so disposed as to be kept in contact with the abutment member 76 of the slider 65. The lever 162 is caused to rotate by the motion of the cam 161, shifting the slider 65 in the direction $Y_1$ (as viewed in FIG. $Y_2$, for example) against the force applied by the spring 73, thereby restoring the slider 65 to the state shown in FIG. 14A.

Figure 16A:
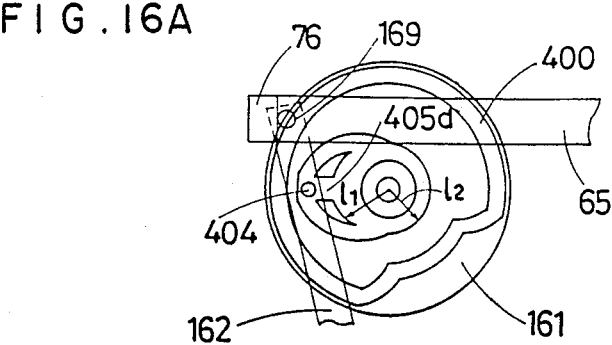
FIGS. 16A, 16B, 16C and 16D are respectively top plan views of the cam unit shown in FIGS. 14A and 14B, diagrammatically illustrating each step of the motion thereof.
Figure 16B:
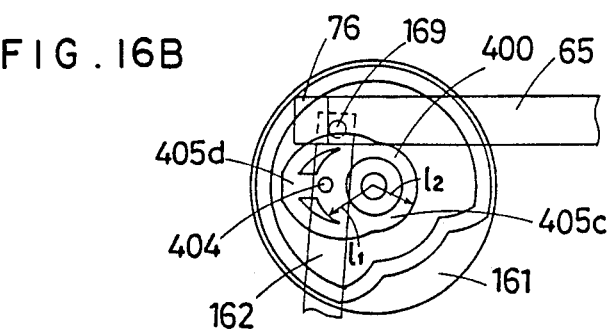
Figure 16C:
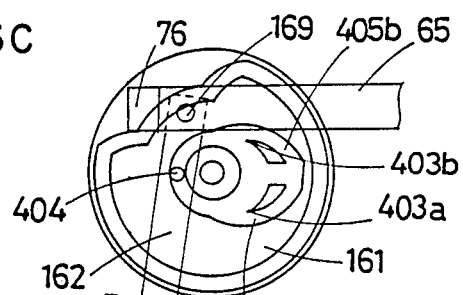

The cam groove 400 will be described with reference to FIG. 16A. The cam groove 400 has cam paths 405a, 405b, 405c and 405d. The cam-groove radius $l_1$ is larger than the cam-groove radius $l_2$. The cam groove 400 is so formed as to drive the levers 167 and 168 in accordance with the timing chart shown in FIG. 10.

Figure 16D:
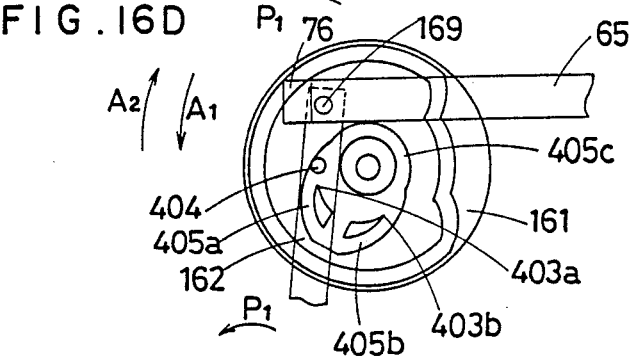

The operation of the cam unit 160 will be described below with reference to FIGS. 8A through 16D, particularly referring to the operations of the cam 161 and the lever 162. FIG. 14A schematically shows the cam unit 160 when no case 2 is inserted in the playback apparatus, and in this state the cam 161 and the interlocking member 404 assume the state shown in FIG. 16A. When the case 2 is inserted into the playback apparatus, the slider 65 is shifted and the engagement pin 169 is thereby shifted by the abutment end 76, thus leading to the state shown in FIGS. 9A and 9B. As shown schematically in FIG. 14B, the slider 65 is stopped by a stopper 410, and thus the slider 65 is inhibited from advancing beyond the stopper. In this state, shown diagrammatically in FIG. 16B, since the engagement pin 169 is urged against the abutment end 76 by the coiled spring 163, the interlocking member 404 assumes the neutral state in which it is kept out of contact with the inner wall of the cam groove 400. The above-mentioned state is indicated by a $t_1$ on the abscissa representative of time plotted in FIG. 15 (each state will hereinafter be referred to as "$t_x$" of the timing chart in FIG. 15). When this state is detected by the microswitch 200, the disc clamping mechanism 90 clamps the disc 6 and starts to draw it out of the case 2. The motor 165 is energized and thus the cam 161 is caused to rotate in the direction $A_2$ as shown in FIG. 14B, so that the levers 167 and 168 are pulled in the direction indicated by arrow $B_2$ shown in FIG. 14B in accordance with the timing chart in FIG. 15. In consequence, the support 180 and the disc raising mechanism 134 are moved upwardly, and thus the disc 6 is supported above the turntable 130 (States $t_2$ and $t_3$). In this state shown schematically in FIG. 16C, since the radius $l_2$ is smaller than the radius $l_1$, the lever 162 is allowed to shift in the direction $P_2$. Since the slider 65 is engaged with the stopper 410, only the lever 162 may be moved. When the cam 161 is further rotated past the state shown in FIG. 16C, the cam unit 160 assumes the following state shown in FIG. 16D. As shown in FIG. 16D, the interlocking member 404 is located at a junction between the cam paths 405a and 405c. However, since the lever 162 is urged in the direction $P_1$ by the spring 163 and in this state the abutment end 76 is kept out of contact with the engagement pin 169, the engagement pin 169 is capable of being further rotated in the direction $P_1$ as shown in FIG. 16D. Therefore, the interlocking member 404 is pressed against the inside wall of the cam path 405a by the coiled spring 163, and when the cam 161 is rotated in the direction $A_2$, the interlocking member 404 is brought into engagement with the cam path 405a. When the cam 161 continues to rotate, the lever 162 is shifted in the direction $B_1$ as shown in FIG. 14B while the lever 168 is shifted in the direction indicated by the arrow $P_1$. While the lever 162 is being shifted in the direction $P_1$, it moves the slider 65 to the state shown in FIG. 14A, thereby releasing the engagement member 62 between the case 2 (State $t_4$). Simultaneously, since the lever 168 is shifted in the direction indicated by the arrow $B_1$ shown in FIG. 14B, the support 180 is moved downwardly (State $t_4$). When the cam 161 is further rotated, the lever 167 is shifted in the direction indicated $B_1$ shown in FIG. 14B and thus the disc raising mechanism 134 is moved downwardly, thereby placing the disc 6 into position on the turntable 130 (State $t_5$). The cam 161 continues to further rotate, thus reaching State $t_6$ in which the position of the cam 161 is detected by a rotary switch (not shown). In State $t_6$, the cam 161 is stopped since the motor 165 is de-energized. This state is diagrammatically depicted in FIGS. 14A and 16A in which the cam 161 is virtually rotated through an angle of 360 degrees.

Subsequently, when a playback switch (not shown) is turned on, the reproduction operation is started. After completion of the reproduction operation, the turntable 130 is stopped, and the disc 6 can be drawn out of the playback apparatus at any time. In this state, when the case 2 is inserted in the slit expanding mechanism 60, the slider 65 is unlocked and the case 2 is temporarily locked within the mechanism 60 (State $t_7$). This state corresponds to that depicted in each of FIGS. 9A, 9B and 16B. When the microswitch 200 detects this state, the motor 165 is energized so as to cause the cam 161 to rotate in the direction $A_1$ opposite to the previously-mentioned direction $A_2$. When the cam 161 is reversed, the lever 167 is pulled in the direction $B_2$ as shown in FIG. 14 and thus the disc raising mechanism 134 is moved upwardly, so that the disc 6 is supported above the turntable 130. The lever 168 is then pulled and the support 180 is thereby moved upwardly so as to carry the disc 6 (State $t_9$). When the cam 161 is further rotated, the lever 167 is shifted in the direction $B_1$ and the disc raising mechanism 134 is moved downwardly (State $t_{10}$). Subsequently, the disc 6 is returned into the case 2 by the motion of the disc clamping mechanism 90. During this motion, the cam 161 is rotated so as to move the lever 168 in the direction $B_1$, and the support 180 is moved downwardly (State $t_{11}$). In the same manner as previously described, when the cam 161 continues to further rotate, the coupling member 404 is brought into engagement with the cam path 405b facing a branching member 403b, and thus the cam unit 160 restores to the state shown in FIG. 16A. In this state, since the lever 162 moves the slider 65, the case 2 is disengaged from the slit expanding mechanism 60 and the apparatus assumes the states shown schematically in FIGS. 8A, 8B and 16A.

To briefly summarize the respective states shown in FIG. 15, $t_0$ represents a stand-by state; $t_1$ represents a state wherein a case is being inserted; $t_2$ represents a raised position; $t_3$ represents a state wherein the support is in the raised position; $t_3'$ represents the position where the slider starts to travel; $t_4$ represents the state wherein the slider is being locked (or the case is being removed); $t_5$ represents a lowered position; $t_6$ represents a stand-by position; $t_7$ represents a state wherein the case is being inserted; $t_8$ represents a raised position; $t_9$ represents a state wherein the support is in the raised position; $t_{10}$ represents lowered position; $t_{11}$ represents a state wherein the support is in the lowered position and $t_{12}$ represents the state wherein the slider is locked (or the case is removed).

The entire operation of the illustrated embodiment of the playback apparatus having the above-described construction will be described in order below. FIGS. 17 through 24C diagrammatically illustrates how the actions of various sections of the playback apparatus are interlocked with one another.

Figure 17:
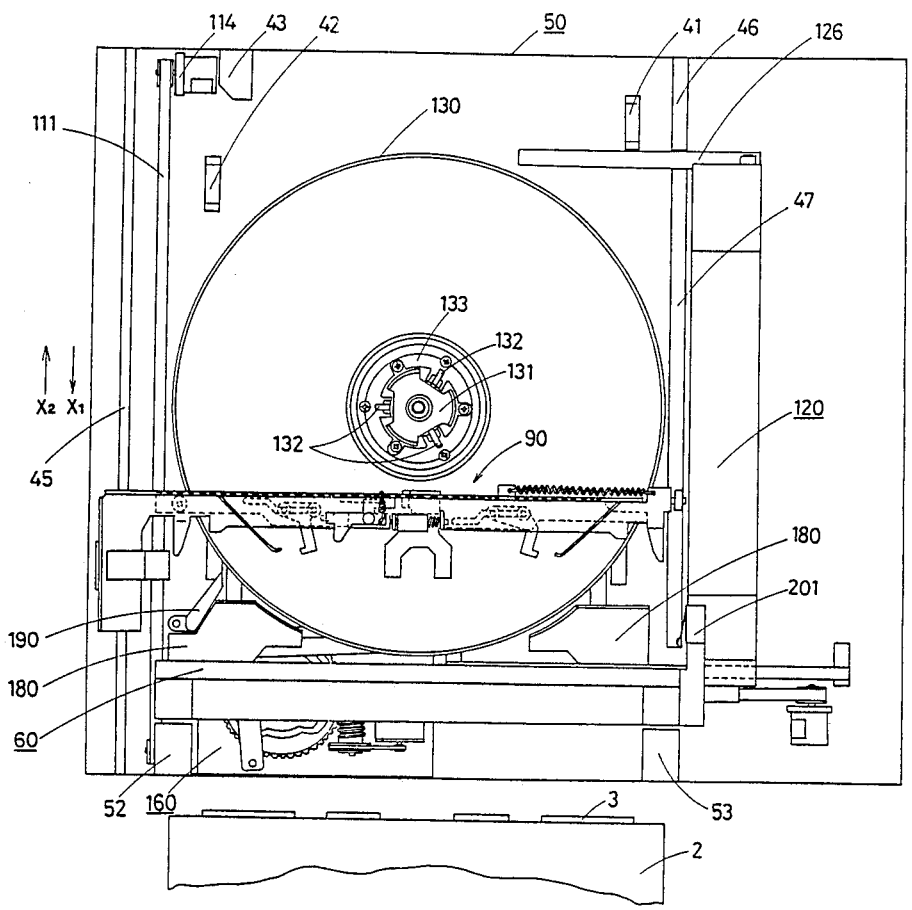
FIGS. 17, 18, 19, 20, 21 and 22 are respectively top plan views partially showing the internal mechanism of the playback apparatus of this invention.
Figure 23A:
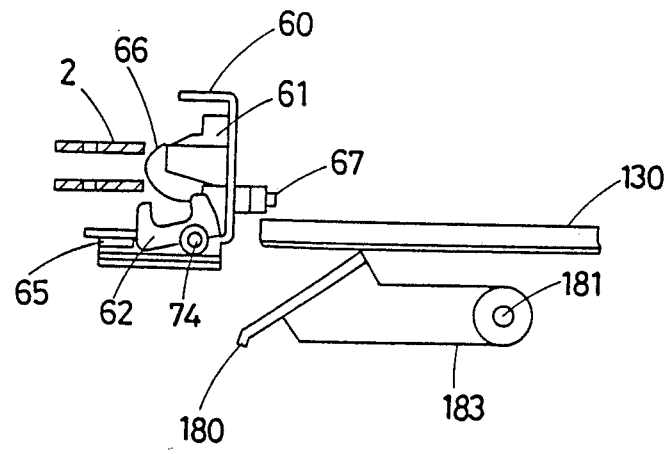
FIGS. 23A and 23B are partially sectional views of the disc and a support therefor, schematically illustrating the relationship therebetween.

FIG. 17 is a plan view schematically showing the internal state of the playback apparatus body 50 in which the case 2 has not yet been inserted. As shown in FIG. 17, the disc clamping mechanism 90 is located in the vicinity of the center of the turntable 130 and between the center and the slit expanding mechanism 60. The disc clamping mechanism 90 is set in the previously-described "non-holding state", and also the support 180 assumes its lowered position as shown in FIG. 23A.

Subsequently, when the case 2 is inserted into the slit expanding mechanism 60 through the guides 52 and 53, the elongated opening 7 (or slit) of the case 2 is expanded by the expanding members 66, and in the slit-expanded state, the case 2 is locked by means of engagement between the engagement member 62 and the engagement hole 13.

Figure 18:
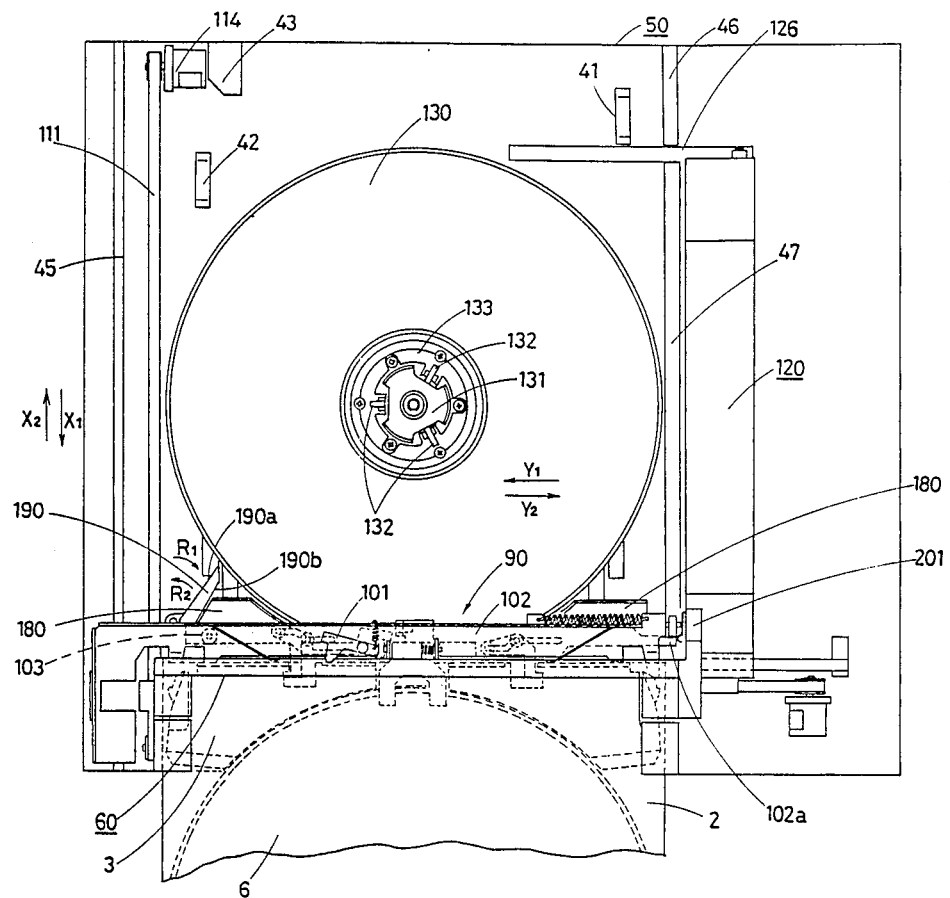

The microswitch 200 shown in FIG. 6 detects this state, and thus the motor 114 is actuated so as to drive the belt 111, thereby feeding the disc clamping mechanism 90 forwardly as viewed in FIG. 17 (in the direction $X_1$). Thus, as shown in FIG. 18, the disc clamping mechanism 90 is inserted into the case 2 through the expanded slit thereof, the restriction of the sliding member 102 is released by the swivel member 101 abutting against the lid 3, thus allowing the sliding member 102 to slide to the right (in the direction indicated by an arrow $Y_2$), thereby causing the disc clamping mechanism 90 to assume the "lid/disc holding state". At this time, since the contact end 102a of the sliding member 102 comes into contact with the microswitch 201, it is detected that the disc clamping mechanism 90 assumes the "lid/disc holding state" in this position. Based on this detection, the motor 114 is reversed, and the disc clamping mechanism 90 starts to be fed backward as viewed in FIG. 18 (in the direction indicated by an arrow $X_2$). At this time, although the roller 103 disposed on the sliding member 102 comes into contact with the slope 190b of the reversing lever 190, since the reversing lever 190 is rotatable in the direction indicated by the arrow $R_2$ as shown in FIG. 18, the lever 190 alone is rotated without adversely affecting the travel of the disc clamping mechanism 90.

Figure 19:
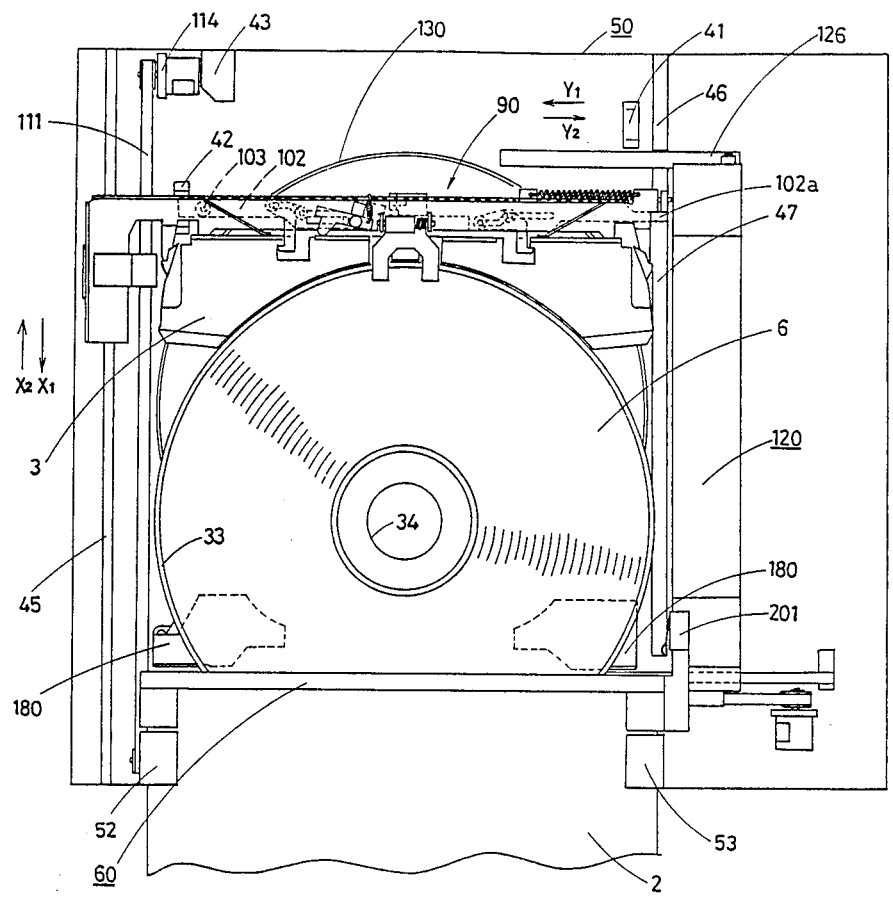
Figure 23B:
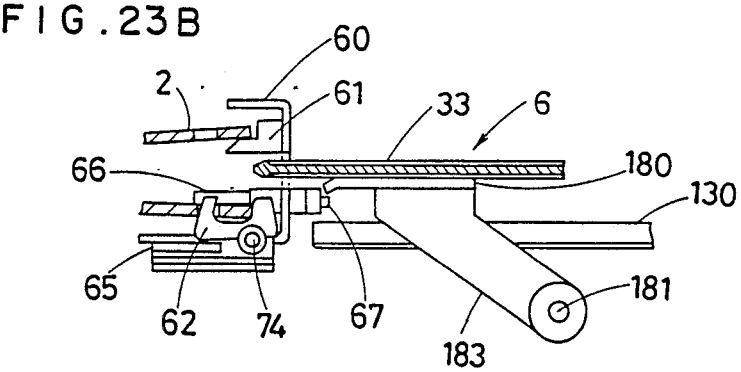

FIG. 19 is a view similar to FIG. 18, schematically showing the internal state of the playback apparatus body 50 in which the disc clamping mechanism 90 is travelling. As shown in FIG. 19, the disc clamping mechanism 90 draws the lid 3 and disc 6 out of the case 2 in a clamping way. When the disc 6 is partially taken out as shown in FIG. 19, the support 180 illustrated schematically in FIG. 23B is moved upwardly, so as to support the disc 6 at the groove guard 33 thereof. At this time, since the support 180 merely comes into contact with the groove guard 33, it never damages the signal-recorded surface of the disc 6.

Figure 20:
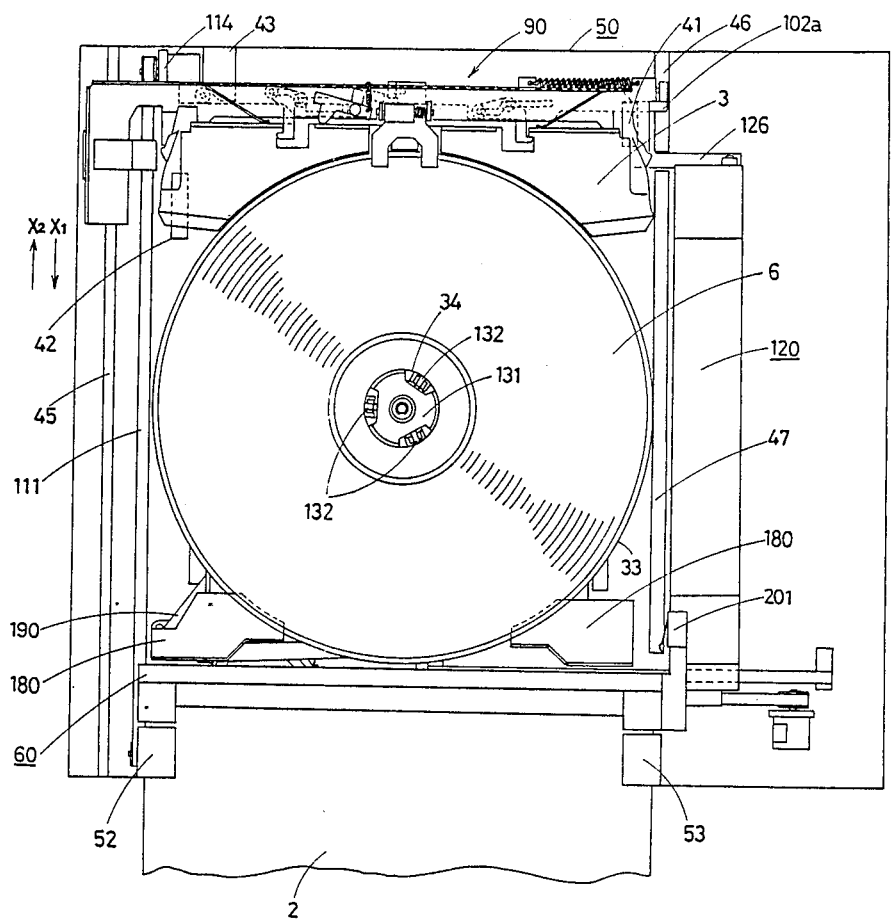

When the disc clamping mechanism 90 is further fed backwardly (in the direction $X_2$), the central hole 34 of the disc 6, as shown in FIG. 20, reaches a position substantially corresponding to the center boss 131 of the turntable 130. In this state as well, the support 180 is capable of supporting the disc 6 while abutting against the groove guard 33 in the illustrated manner.

Figure 21:
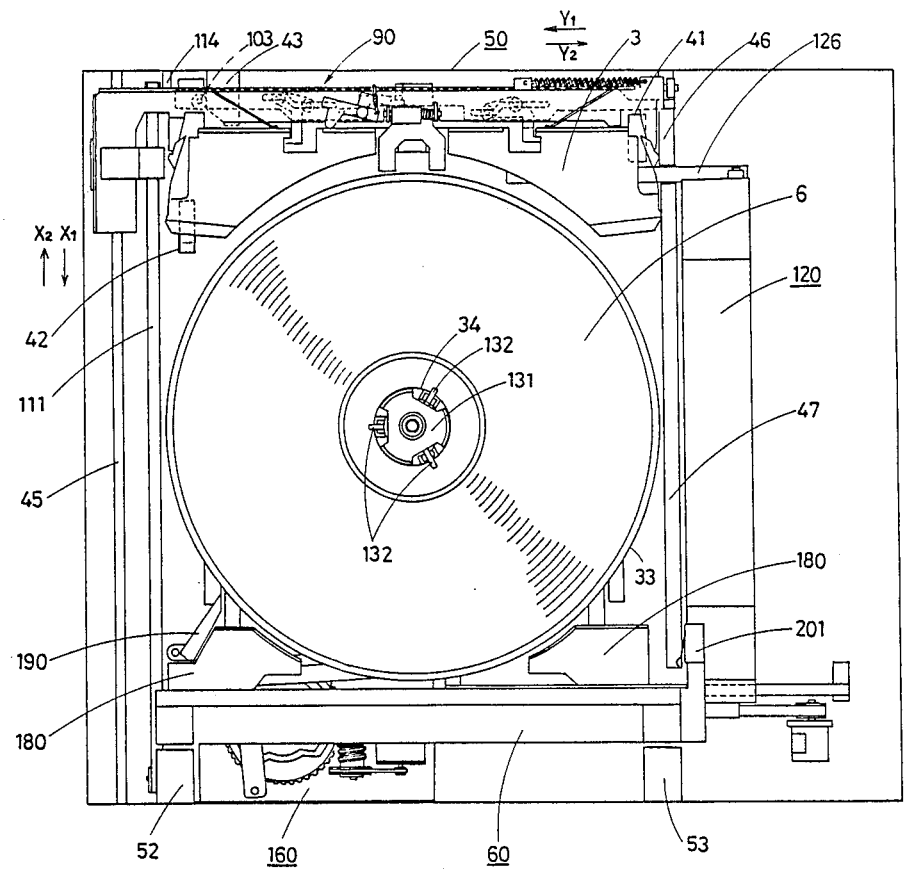
Figure 24A:
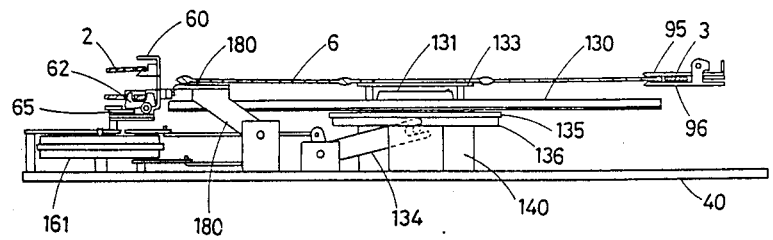
FIGS. 24A, 24B and 24C are respectively longitudinal, partially sectional views of a part of the playback apparatus of this invention, showing the detailed physical relationship between the disc, the support and peripheral elements thereof.
Figure 24B:
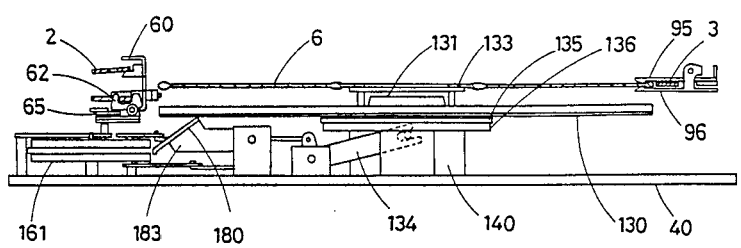
Figure 24C:
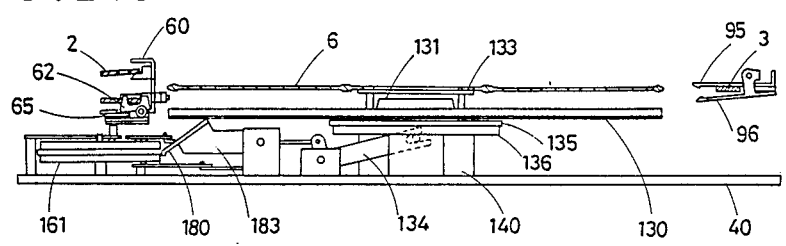

Subsequently, as shown in the side view in FIG. 24A, the central disc support ring 133 is moved upwardly by the motion of the cam unit 160, so as to support the central portion of the disc 6. As shown in FIG. 24B, the support 180 is moved downwardly by the motion of the cam unit 160. When the disc clamping mechanism 90 is further fed backwardly (in the direction $X_2$), the roller 103 disposed on the sliding member 102 of the disc clamping mechanism 90 comes into contact with the slope of the contact member 43 and thus the sliding member 102 is made to shift leftwardly (in the direction $Y_1$), thus returning to the previously described "lid holding state". In other words, the disc clamping mechanism 90 is not clamping the disc 6, as shown in FIG. 21. In this state, as shown in FIG. 24C, the disc 6 is carried by the central disc support ring 133. Subsequently, when the disc support ring 133 is moved downwardly by the motion of the cam unit 160, the disc 6 is placed on the turntable 130. Then, the motion of the cam unit 160 causes the release of the engagement between the case 2 and the engagement member 62 of the slit expanding mechanism 60, so that the user can take the thus-emptied case 2 out of the playback apparatus.

In this state, while the turntable 130 is being rotated, the arm housing 120 scans the rotating disc 6 for reproduction purposes. During this time, since the lid 3 is carried from below by lid supporting members 41 and 42 as shown in FIG. 21, the lid 3 is prevented from being inclined so downwardly as to come into contact with the arm housing 120.

Upon completion of reproduction, when the user inserts the aforementioned empty case 2 into the playback apparatus, the engagement member 62 of the slit expanding mechanism 60 comes into engagement with the case 2, so that the case 2 is temporarily locked within the playback apparatus 50. When the microswitch 200 detects this state in the same manner as described above, the cam unit 160 is actuated so as to move the disc support ring 133 upwardly, thus leading to the state shown in FIG. 24C.

Next, the disc clamping mechanism 90 is fed forwardly (in the direction indicated by an arrow $X_1$) by the motion of the belt 111 driven by the motor 114, and the process proceeds to the state shown in FIG. 24B. The state shown in FIG. 24A comes to be effective after the result of the upward movement of the support 180 caused by the motion of the cam unit 160. Subsequently, the disc support ring 133 is moved downwardly by the motion of the cam unit 160, and the disc clamping mechanism 90 is fed forwardly (in the direction $X_1$) by the movement of the belt 111 driven by the motor 114 while it is holding the lid 3 and the disc 6. Specifically, the process proceeds from the FIG. 20 state to the FIG. 19 state.

Figure 22:
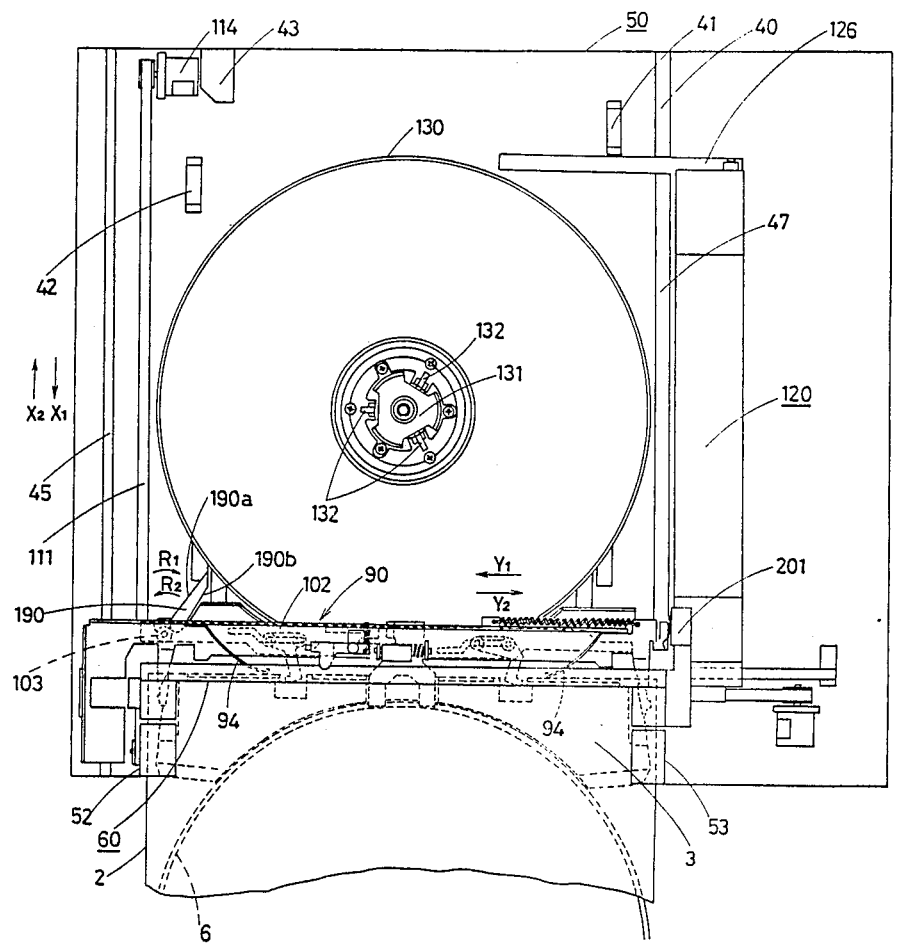

When the disc clamping mechanism 90 is fed forward (in the direction X₁), the roller 103 disposed on the sliding member 102 comes into contact with the slope 190a of the reversing lever 190. At this time, since the reversing lever 190 is precluded from rotating in the direction indicated by an arrow R₁, the roller 103 is allowed to move up along the slope 190a and the sliding member 102 is made to shift to the left (in the direction Y₁). In consequence, the sliding member 102 assumes the "non-holding state" and, as shown in FIG. 22, the lid 3 is forced into the slit of the case 2 by the force applied by the leaf spring 94.

Subsequently, when the motor 114 is reversed again, the disc clamping mechanism 90 is fed backwardly (in the direction X₂) and is returned to the position shown in FIG. 17. In the same manner as described previously, the movement of the cam unit 160 causes the release of the engagement between the case 2 and the engagement member 62 of the slit expanding mechanism 60. After the disc 6 has been returned into the case 2 and the lid 3 has been completely refitted into the case 2, the user can take the case 2 out of the playback apparatus body 50.

In this fashion, when the user inserts the case 2 very slightly into the body 50, the disc 6 is automatically drawn out of the case 2, and the reproduction of the signals recorded on the disc is then possible. Also, the disc 2 is automatically returned into the case 2. Therefore, since the case 2 does not have to be manually moved back and forth to any substantially extent, the user can easily handle the playback apparatus. Thus, even if the user handles the apparatus very roughly, the apparatus is capable of being operated positively. Since only the lid 3 and the disc 6 are loaded into the interior of the playback apparatus body 50 rather than the entire case 2, the thickness of the body 50 can be reduced as compared with a prior-art system in which the entire case 2 is loaded inside.

Although the illustrated embodiment of the playback apparatus is operated as described above, the action of the apparatus may be controlled by means of a suitable microcomputer. Specifically, the above-described action may be realized by a suitable combination of a microcomputer and a conventional control circuit capable of causing the sequential motion of the motor 114 for driving the disc clamping mechanism 90, the motor 124 for driving the arm housing 120 and the cam driving motor 165.

The stoppage of the disc clamping mechanism 90 at the respective positions shown in FIGS. 17, 19, 20, 21 and 22 may be programmed in such a way that the motor 114 is stopped by detecting that the contact plate 109 mounted on the disc clamping mechanism 90 comes into contact with the microswitches 202 to 205 shown in FIG. 6A.

INDUSTRIAL APPLICABILITY

As will be readily understood by those skilled in the art, the recording disc playback apparatus in accordance with the present invention possesses advantage in that, when a user inserts a disc case slightly into the body of the playback apparatus, a recording disc medium is automatically drawn out of the case for reproduction purposes, and also the positive operation is enabled at any time.

What is claimed is:

1. A recording disc playback apparatus for use with a rectangular disc case having a case body defining therein an accommodating space for storing therein a disc-like recording medium and formed at one end thereof with an opening for drawing out said disc-like recording medium from said accommodating space and a lid removably engaged with said opening, said recording disc playback apparatus comprising:

an external casing having a front surface formed therein with a case insertion opening adapted to receive only a front portion of said disc case including said opening, said lid and a part of said disc case to which said lid is engaged;

a turntable disposed in said external casing and adapted to rotate a said disc-like recording medium drawn out from said case body of said disc case and set thereon;

a reproducing head for reading signals on said disc-like recording medium rotated by said turntable;

a lid releasing means disposed in said external casing in the vicinity of said case insertion opening, for releasing the engagement between said case body of said disc case and said lid;

a clamping means disposed in said external casing for clamping one end of a said recording medium held in said case, once said lid of said disc case is released from said case body, to thereby permit withdrawal of said recording medium from said case body;

a feed means for reciprocally feeding said clamping means along a feed path between an advanced position where said clamping means is advanced to approach said case insertion opening so that said clamping means can clamp a said recording medium in a said case body, and a retracted position where said clamping means is retracted rearward in said external casing so that a clamped recording medium can be set on said turntable.

2. A recording disc playback apparatus according to claim 1 further comprising lid locking means which is disposed together with said clamping means on said feed means so that it may be fed to a position where said locking means detachably engages with said lid.

3. A recording disc playback apparatus according to claim 1, wherein said clamp means is capable of being opened and closed, and further comprising:

means for opening and closing said clamp means for causing said clamp means to open within a portion of a feed path followed by said feed means and to close the same within another portion of said feed path.

* * * * *